April 26, 1955

W. ALTAR ET AL 2,707,269

MICROWAVE AMPLITUDE MODULATOR

Filed Oct. 15, 1948

WITNESSES:
E. A. McClaskey
Mervin W. Dodd

INVENTORS
William Altar &
Theadore Miller.
BY
Hymen Diamond
ATTORNEY

United States Patent Office 2,707,269

Patented Apr. 26, 1955

2,707,269

MICROWAVE AMPLITUDE MODULATOR

William Altar and Theadore Miller, Pittsburgh, Pa., assignors to Westinghouse Electric Corporation, East Pittsburgh, Pa., a corporation of Pennsylvania Application October 15, 1948, Serial No. 54,746

5 Claims. (Cl. 332—56)

Our invention relates to modulation and it has particular relation to amplitude modulation of microwaves.

Our invention is an improvement over the invention of R. T. Gabler and William Altar disclosed in their Patent No. 2,545,994 and assigned to Westinghouse Electric Corporation. In that application modulation is produced by a system of wave guides employing four reactance tubes or their equivalent for varying the impedance of the wave guides. As these reactance tubes are somewhat expensive and cumbersome, it is desirable to devise a method and apparatus for amplitude modulation which does not produce frequency modulation and which employs a minimum number of reactance tubes or their equivalent.

It is accordingly an object of our invention to provide apparatus for amplitude modulation of microwaves which is compact.

Another object of our invention is to provide apparatus for amplitude modulation of microwaves which is relatively inexpensive to produce.

In accordance with our invention, we provide apparatus in which the modulation is effected through use of a system of wave guides joined in magic tees or hybrid junctions. The microwaves from a microwave generator, such as a klystron oscillator, are fed into two wave guides, one of which is connected directly to an output magic tee junction. The other wave guide connected to the source of oscillations is connected to a line stretcher which, in turn, is also connected to the output magic tee junction. The line stretcher described in the specification comprises a magic tee connected through a first branch to the source of oscillations and connected through a fourth branch to an output. A second and a third branch differ in length by one-quarter wave length and have two equal and simultaneously variable impedances at their extremities. The oscillations passing into the line stretcher through the first branch are diverted into the second and third branches. As the impedance in the second and third branches are equal, the oscillations in the two branches will be changed in phase by the variations in impedance by the same quantity at any time. Having encountered the same impedance and having travelled paths differing in length by one half wave length, the oscillations, when they return to the junction, will be out of phase with each other. Therefore, all of the oscillations will pass out the fourth branch. However, the phase of the oscillations passing out the fourth branch will have been changed according to the impedance present in the second and third wave guides.

Thus, by varying the impedance of the variable loads in the line stretcher, we vary the phase of the oscillations entering the output magic tee through one branch while the oscillations entering the output magic tee direct from the source of oscillations through the other branch will remain unchanged. The amount that these waves entering the output magic T through the two input branches are out of phase with each other will determine the quantity of power going out the output branch and the amount that is dumped into the non-reflecting load.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawing, in which:

Figure 1:
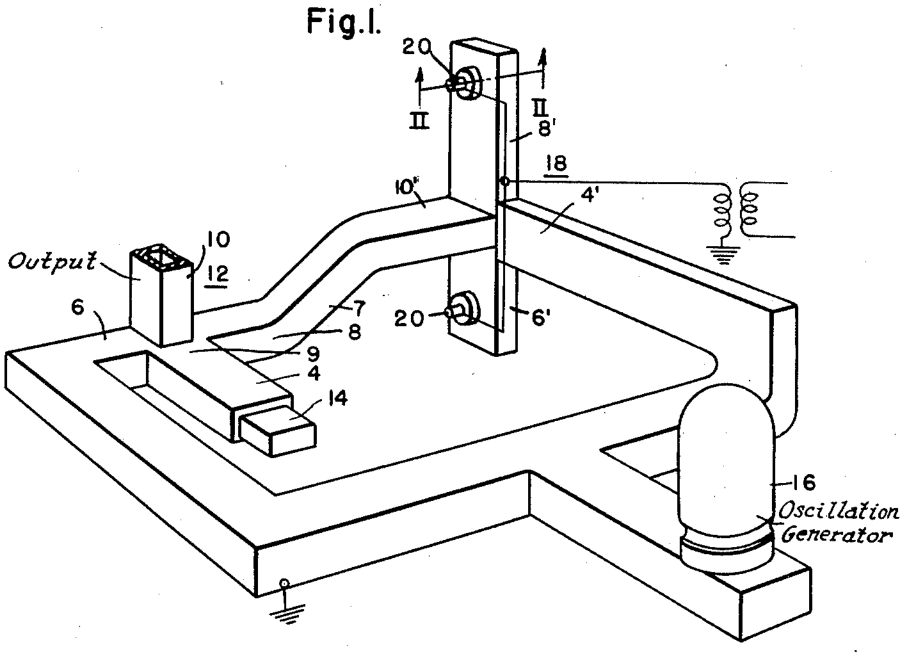
Fig. 1 is a perspective view of an embodiment of our invention.

The apparatus shown in Fig. 1 comprises a system of wave guides joined together in what are known in the art as magic tees or hybrid junctions. The magic tee as described here has four branches. A first branch 4 is joined to the face of least area 7 of a second branch 6 and a third branch 8, the second branch 6 and third branch 8 comprising a straight rectangular wave guide with the magic tee junction 9 near its center, the first branch entering through the face of least area perpendicular to that face and so oriented that the sides of greatest area of the first, second and third branches 4, 6, 8 lie in parallel planes.

Joined to the first, second and third branches 4, 6, 8 at the magic tee junction is a fourth branch 10 extending in a direction perpendicular to the plane of the first, second and third branches 4, 6, 8 and with the long dimension of its cross section parallel to the direction of the first branch 4.

Connected to the first branch 4 of an output magic tee 12 is a non-reflecting load 14 capable of absorbing the energy of the waves entering it. Connected to the second branch 6 of the output tee 12 is a microwave generator 16 such as a klystron oscillator. The third branch 8 of the output tee is connected to the microwave generator through what is known in the art as a line stretcher 18.

The line stretcher 18 employed in our invention comprises a magic tee junction, the first branch 4' of which is connected to the microwave generator 16 or other supply of oscillations. The second and third branches 6', 8' of the line stretcher tee 18 differ in length by one quarter wave length as measured in the wave guide. At an equal distance from the extremities of the second and third branches 6', 8' of the line stretcher 18, are placed variable impedances 20, these variable impedances being so constructed and connected that their impedance may be varied in accordance with the signal to be impressed on the microwave oscillations. The fourth branch 10' of the line stretcher 18 is connected to the third branch 8 of the output hybrid junction 12.

Figure 2:
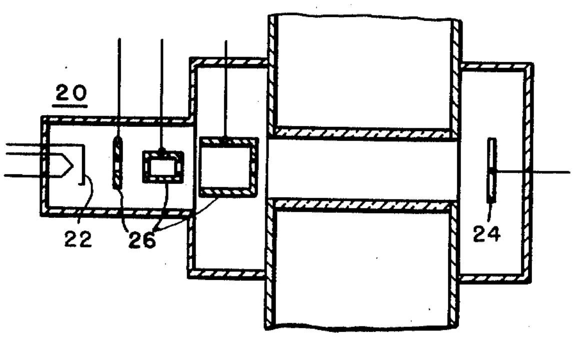
Fig. 2 is a sectional view taken along line II—II of Fig. 1 of the reactance tube employed in an embodiment of our invention.

Shown in Fig. 2 is a cross sectional view of a reactance tube which may be employed to vary the impedance of the second and third branches 6', 8' of the line stretcher 18. In the reactance tube electrons are emitted from a filament 22 on one side of the wave guide and are attracted through the wave guide by a plate 24 on the opposite side. The number of electrons passing through the wave guide is determined by varying the potential on one or more grids 26 which may also act as focusing electrodes. Variations in the number of electrons passing through the guide in unit time will cause variations in the impedance offered by the wave guide to the oscillations therein. The variations in impedance produce changes in phase in the oscillations in the wave guide. This reactance tube is not being claimed here and is only given as a method which may be employed to vary impedances of the second and third branches of the line stretcher.

Oscillations from the oscillator or other source of microwaves are directed into the two wave guides, one of which leads directly to the output magic tee junction and the other of which leads to the line stretcher. The oscillations travelling direct from the generator to the ouput junction will remain constant, whereas, the oscillations passing through the line stretcher will be varied in phase according to the current flowing through and thus to the impedance of the variable impedances of the second and third branches of the line stretcher. Oscillations from a line stretcher 18 are prevented from being reflected back toward the microwave generator 16 by the difference in length of one quarter wave length between the second branch 6' and the third branch 8' of the line stretcher 18. This difference in length of one quarter wave length causes the oscillations reflected from the two branches to be completely out of phase and thus all of the oscillations pass out the fourth branch 10'. It is, therefore, necessary that the impedances of the second and third branches 6', 8' of the line stretcher 18 be equal at all times for otherwise part of the oscillations will be reflected toward the source of oscillations 16.

In the output junction, those components of the oscillations entering the second and third branches 6, 8 which are out of phase will pass out the fourth branch 10, while that component which is in phase will pass through the first branch into the non-reflecting load 14 where it will be absorbed.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In combination, a source of oscillations, a first wave guide connected to said source of oscillations, a second wave guide and a third wave guide connected to said first wave guide through a magic tee junction, said second wave guide being perpendicular to said first wave guide, a first variable reactance connected to said second wave guide near one end, a second variable reactance connected to said second wave guide near the opposite end from that at which said first variable reactance is connected, the distance of said second variable reactance from the magic tee junction differing from the distance of said first variable reactance from the magic tee junction by one quarter wave length, as measured in the guide, a fourth wave guide connected to said third wave guide at one end through an output magic tee junction, said fourth wave guide being connected at its other end to said source of oscillations, a non-reflecting load wave guide and an output wave guide, connected to said third and said fourth wave guides through said output magic tee junction, connections for applying a modulation potential connected to said first and said second variable reactances in such manner that the magnitudes of said first and said second variable reactances are equal.

2. In combination, four wave guides joined in a magic tee junction, a source of electromagnetic oscillations connected to a first of said wave guides, a first variable reactance being connected to a second of said wave guides and a second variable reactance being connected to a third of said wave guides, the difference in distance between the magic tee junction and the first variable reactance and between the magic tee junction and the second variable reactance being equal to one quarter wave length, and means for deriving the net energy produced therefrom connected to the fourth of said wave guides.

3. A line stretcher comprising four wave guides joined in a magic tee junction, a source of oscillations connected to a first of said wave guides, variable reactance in a second and a third of said wave guides, said variable reactances being so located that the difference in distance between the variable reactance in said second wave guide and the said magic tee junction and between the variable reactance in said third wave guide and said magic tee junction being equal to one quarter wave length as measured in the wave guides, connections for applying a modulation potential connected to said variable reactances, and means for deriving the net energy produced connected to the fourth branch.

4. A line stretcher comprising a main wave guide of rectangular cross section with a first branch leaving it at right angles from the middle of its side of smallest area, said first branch having the long dimension of any cross section parallel to the length of said main wave guide, a source of high frequency oscillations connected to said first branch, variable reactances terminating said main wave guide, connections for applying a modulation potential connected to said variable reactances, said variable reactances being so located that the difference in distance of a first of said variable reactances from the junction of said main wave guide with said first branch and the distance of the second of said variable reactances from said junction is equal to one quarter wave length as measured in the guide, a second branch also joining said main wave guide at the center of its side of greatest area and being at right angles to said wave guide and having the long dimension of any cross section perpendicular to the length of said main wave guide, said second branch to derive the net energy produced thereby.

5. In combination, a modulation magic tee including an input branch, an output branch and two reactance branches, means for varying the reactance of said reactance branches, an output magic tee including a pair of input waveguides and an output waveguide, and connections between said output waveguide of said modulation magic tee and one of said input waveguides of said output magic tee.

References Cited in the file of this patent

UNITED STATES PATENTS

| | | |
|---|---|---|
| 2,421,725 | Stewart | June 3, 1947 |
| 2,447,543 | Smullin | Aug. 24, 1948 |
| 2,453,453 | Norton | Nov. 9, 1948 |
| 2,462,841 | Bruck et al. | Mar. 1, 1949 |
| 2,462,893 | Pontecorvo | Mar. 1, 1949 |
| 2,475,474 | Bruck et al. | July 5, 1949 |
| 2,477,428 | Sprague et al. | July 25, 1949 |
| 2,484,256 | Vaughan | Oct. 11, 1949 |
| 2,496,521 | Dicke | Feb. 7, 1950 |
| 2,593,120 | Dicke | Apr. 15, 1952 |